United States Patent [19]

Hipkins

[11] 4,023,373
[45] May 17, 1977

[54] ANCHOR BOLT ASSEMBLY AND UTILIZATION

[75] Inventor: Edward C. Hipkins, Oakdale, Pa.

[73] Assignee: Union Forge, Inc., Noblestown, Pa.

[22] Filed: June 14, 1976

[21] Appl. No.: 695,724

[52] U.S. Cl. .................................. 61/45 B; 85/63; 85/74

[51] Int. Cl.² .................................... E21D 20/02

[58] Field of Search ................. 61/45 B, 63; 85/63, 85/72, 74, 61, 32 CS; 52/698, 704

[56] References Cited

UNITED STATES PATENTS

| | | | |
|---|---|---|---|
| 2,952,129 | 9/1960 | Dempsey | 61/45 B |
| 3,188,815 | 6/1965 | Schuermann et al. | 61/45 B |
| 3,877,235 | 4/1975 | Hill | 61/45 B |
| 3,896,627 | 7/1975 | Brown | 85/63 X |

Primary Examiner—Dennis L. Taylor
Attorney, Agent, or Firm—Carothers and Carothers

[57] ABSTRACT

An anchor bolt assembly for strengthening mine roofs constructed of a cylindrical anchor member having a bolt threadably received in one end and a temporary thread advancing stop carried on the stem of the bolt which releases or gives only after a predetermined torque is applied to the bolt, relative to the anchor member, to permit the bolt to be finally drawn up against the face of the mine roof after the anchor member into which it is threaded has been solidly secured with an adhesive resin material within a predrilled bore hole in the mine roof. The stop provided on the bolt stem may be of a type which shears or strips from its position on the bolt stem when the bolt is threadably advanced into the anchor member with the application of a predetermined relative torque, or the stop may be in the form of a frusto-conical wedge secured to the bolt stem and having the narrow end of the wedge projecting into a large counterbore in the end of the anchor member so that the frusto-conical face of the wedge seats against the inside opening of the counterbore to act as a stop. In this latter-mentioned stop, the counterbored end of the anchor member is provided with a plurality of annularly spaced open end slots so that upon applying the predetermined torque to the bolt relative to the anchor member, the frusto-conical wedge is further forced into the counterbore causing the slotted end of the anchor member to radially expand and engage the sides of the bore hole as an additional anchor member.

12 Claims, 5 Drawing Figures

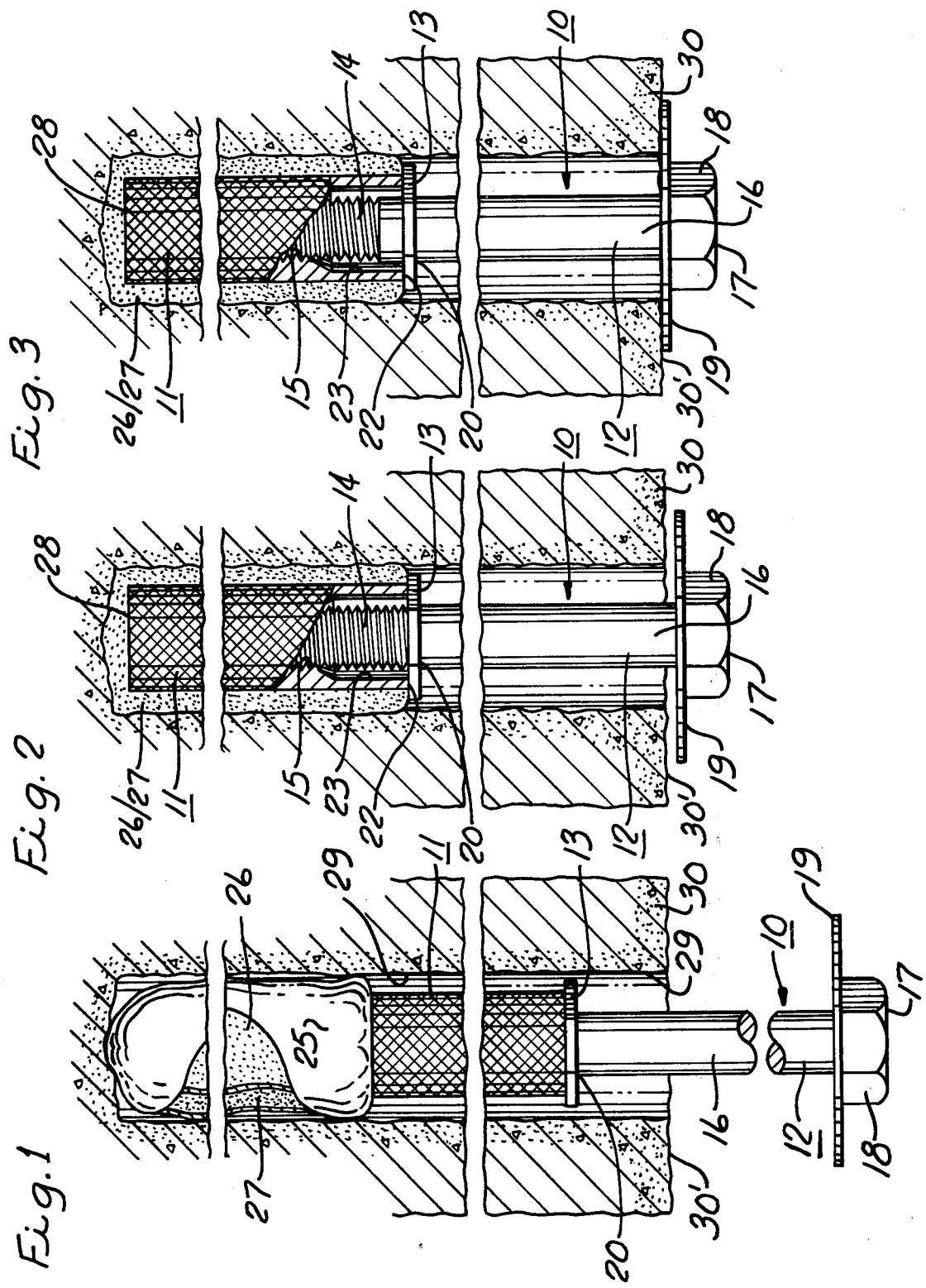

ANCHOR BOLT ASSEMBLY AND UTILIZATION

BACKGROUND OF THE INVENTION

1. Field of the Invention

This invention pertains generally to bolting assemblies particularly designed for use in strengthening mine roofs, and more particularly to anochor bolt assemblies of the type wherein a quick-setting adhesive is used to initially secure the bolt assembly in a predrilled bore hole.

2. Discussion of the Prior Art

Two different types of anchor bolts have been utilized for strengthening roofs in tunnels and coal mines. The older type is a mechanical anchor which expands within the bore hole to engage the sides of the bore hole upon threading a bolt into the expandable anchor member. In more recent years, the use of mechanical type anchor bolt has been supplemented with the use of anchor bolt assemblies which are secured in the bore hole by the use of a quick-setting adhesive in the case of poor mine roof conditions where conventional bolting is not working.

In the adhesive type bolting system, an elongated hole is bored into the rock structure and a thin-skinned resin capsule which contains unmixed quantities of quick-setting adhesive resin and catalyst hardener resin materials is then positioned in the back of the bore hole. The anchor bolt assembly, which generally consists of an elongated cylindrical anchor member and a bolt threadably received in one end of the anchor, is then inserted into the bore hole with the anchor member being inserted first. The entire bolting assembly is then rotated with a power tool such as an impact wrench so that the anchor member ruptures the thin-skinned capsule and the rotation of the anchor member subsequently mixes the adhesive resin and catalyst hardener resin and flows it uniformly about the bore hole and the outer surface of the anchor member. Rotation is ceased and the resin sets or hardens in a matter of seconds. After the resin has set, the bolt is again rotated such that it threadably advances into the anchor member which is now secured within the bore hole in order to draw the bolt head, or the bearing plate lying under the bolt head, up against the face of the rocklike structure about the opening of the bore hole.

The adhesive-type bolting assembly has the advantage that the adhesive strengthens the surrounding rock formation as well as anchors the bolt assembly and in addition, the bolts may be torqued up to tighten up again at some later time after the initial installation if required, which is not always possible with the mechanical type anchor, as it can tend to lose its grip to the side walls of the bore hole.

A good example of the resin-type anchor bolt assembly is illustrated in U.S. Pat. No. 3,877,235, issued Apr. 15, 1975. This anchor bolt assembly utilizes a stop means which is secured to the same end of the anchor member that threadably receives the bolt. The stop permits the entire bolt assembly to be rotated as a unit for mixing and spreading the resin adhesive. Once the resin adhesive is set, the bolt is again torqued, and since the anchor member is rigidly anchored within the bore hole, the stop means is sheared by the bolt so that the bolt may thereafter threadably advance into the anchor member and be drawn up tight against the outer face of the rocklike structure. The present invention relates to an improvement of this anchor bolt assembly.

U.S. Pat. No. 3,188,815 issued June 15, 1965, illustrates another resin-type bolt assembly. However, this anchor bolt assembly also illustrates a mechanical type anchor used in combination with the resin anchor. The present invention in one embodiment is also an improvment on this combination anchor bolt assembly, and it is also an object of the present invention to provide a less complex anchor bolt assembly structure which is more economical to manufactue.

SUMMARY OF THE INVENTION

The resin-type anchor bolt assembly of the present invention is comprised of an elongated anchor member and a headed bolt which has a threaded stem portion threadably received within a threaded bore in one end of the anchor member. Stop means is carried on the stem of the bolt at a predetermined position to initially limit the extent of threadable advancement of the stem portion into the threaded interior of the anchor member as the stop means engages the end of the anchor member. This stop means is releasable upon application of a predetermined thread advancing torque to the bolt relative to the anchor member so that the bolt may be drawn up tight against the face of the rocklike structure after the anchor member has been secured with an adhesive.

In one embodiment, the stop means may consist of a nut threadably received on the bolt stem and engaging a thread stop on the bolt stem. The nut has thin wall thread engaging portions which are strippable over the thread stop upon application of the predetermined torque to the bolt relative to the anchor member. In this configuration, a counterbore in the threaded bore of the anchor member may be provided, if required, at the end at whih the bolt is received into the anchor member in order to permit the thread stop to advance into the anchor member bore with clearance after the stop means has been released so that the thread stop does not interfere with the threaded advancement of the bolt into the anchor member. The thread stop may be nothing more than the conventional transition point from a threaded stem end portion of the bolt to a non-threaded stem or shank portion of the bolt which is adjacent the bolt head.. The stop nut is thus stripped over the non-threaded portion upon application of the predetermined torque.

The diameter of the nut is also made larger than the diameter of the anchor member so that the perimetral or peripheral projection of the nut beyond the sides of the anchor member acts as a seal to inhibit the flow of the initially liquid adhesive over the surface of the anchor member from reaching the threaded portion of the bolt.

In a second embodiment, the stop means is provided by a different combination of elements. Again, a counterbore is provided at the end of the anchor means at which the bolt stem is inserted in order to provide a relatively thin counterbore wall. This counterbore wall is provided with a plurality of annularly spaced longitudinal open end slots to permit forced radial spreading of the counterbore end of the anchor member. An annular seal is carried by and around the anchor member beyond the closed ends of those slots for inhibiting the flow of an adhesive on the other end of the anchor member to the slotted end. The stop means consists of a frusto-conical stop wedge which is fixed on the bolt stem at a predetermined position with the narrow-diameter end of the wedge projecting into the counterbore such that the frusto-conical surface of the wedge engages the inside open end of the counterbore.

Once the anchor member has been set with the resin in the bore hole, the predetermined torque is applied to the bolt which permits the wedge to further advance into the slotted counterbore a radially spread the counterbore until the slotted ends engage the side walls as a mechanical anchor and the bolt head or bearing plate under the bolt head is drawn up tight against the outer face of the rocklike structure surrounding the bore hole.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

FIG. 1 is a vertical section in elevation showing one embodiment of the anchor bolt assembly of the present invention, and also showing an initial step in its utilization.

FIG. 2 is a vetical section in elevation similar to FIG. 1 but showning an intermediate step in the utilization of the anchor bolt assembly of the present invention.

FIG. 3 is a vertical section in elevation similar to FIGS. 1 and 2, illustrating the final step in the utilization of the anchor bolt assembly of the present invention.

DESCRIPTION OF THE PREFERRED EMBODIMENTS

Figure 5:
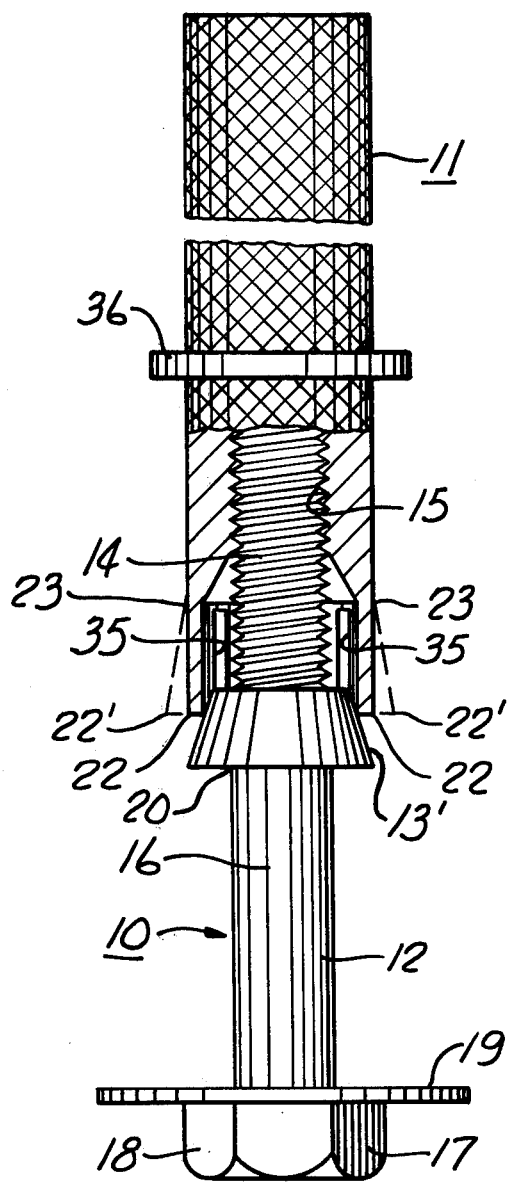
FIG. 5 is a vertical section in elevation showing the construction of a second embodiment of the anchor bolt assembly of the present invention.

Referring to FIGS. 1 and 2, the anchor bolt assembly 10 consists of three elements; namely, elongated cylindrical anchor member 11, bolt 12, and stop nut 13. Bolt 12 has a threaded stem portion 14 which is threadably received within bore 15 in the end of anchor member 11. Bolt 12 also has an unthreaded stem or shank portion 16 which is adjacent bolt head 17. Bolt head 17 is described as consisting of a combination of head 18 and bearing plate 19, which immediately underlies the head 18 and may be a separate washer-type bearing plate (as is shown in the drawings), or it may be formed integrally with head 18.

The transition point between the threaded stem portion 14 of bolt 12 and the unthreaded stem portion 16 as indicated at 20 serves as a thread top for stop nut 13. A more detailed view of stop nut 13 is shown in FIG. 4.

Figure 4:
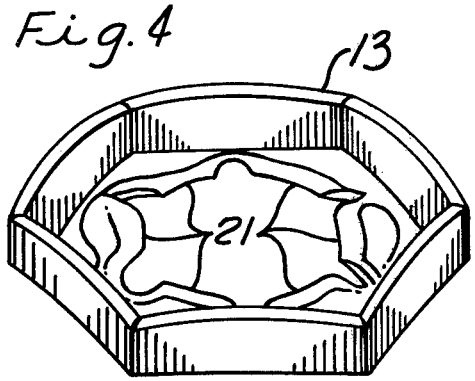
FIG. 4 is a perspective view showing the detail of the stop nut utilized in the anchor bolt assembly illustrated in FIGS. 1, 2 and 3.

Referring to FIG. 4, it may be seen that stop nut 13 has thin wall thread engaging portions 21 which permit the nut to be threaded onto stem portion 14. Stop nut 13 is thus threaded onto stem 14 until thread engagin portions 21 engage thread stop 20. Threaded stem portion 14 is then threadably advanced into threaded bore 15 of anchor member 11 until stop nut 13 abuts against the end 22 of anchor member 11 as illustrated in the FIGS.

Threaded bore 15 is also provided with a counterbore 23 of larger diameter at end 22 of the anchor member. This counterbore 23 is provided to permit clearance for the unthreaded shank portion 16 of bolt 12 as will be described hereinafter.

In the assembled form as illustrated, if anchor member 11 is held rigid and a predetermined torque (usually about 50 to 60 ft. lbs.) is applied to bolt head 17 in order to threadably advance the threaded stem portion 14 further into bore 15, the thin wall thread engaging portions 21 of stop nut 13 will strip over thread stop 20 onto the unthreaded stem portion 16 so as to release the effect of the stop means provided by nut 13 and thread stop 20.

Stop nut 13 is a spring steel thin wall locking nut which sells under the trademark "PALNUT" and is manufacured by The Palnut Company Division of TRW, Inc. Other strippable locknuts may be used such as half nuts, etc.

In carrying out the invention, an adhesive resin capsule, cartridge or sausage 25 contains a main body of resin material 26 and a segregated supplemental body of a catalyst, curing, or hardening resin 27. Both resins are contained in a relatively thin-wall resin bag or sausage that is easily ruptured or broken by the rotative advance of the forward end 28 of anchor member 11 into bore hole 29.

Bore hole 29 is drilled into the rocklike structure 30 to receive the capsule or cartridge 25 and subsequently anchor bolt assembly 10.

The depth of bore hole 29 varies depending upon the type of rock strata which is being strengthened. If the rock structure 30 is unstable, a longer anchor member 11 will be employed and thus the bore hole 29 will be bored correspondingly deeper. Bore hole 29 is usually bored so that there is approxiamtely ⅛ inch clearance between all the outer surfaces of the anchor member 11 and the bore hole 29.

Anchor member 11 is a solid cylindrical member which is bored for threaded bore 15 and counterbore 23. It also may be a tubular member which is closed off at one end and threaded in its interior bore to receive the threaded bolt.

As previously stated, the length of anchor member 11 will vary in accordance with the rock condition, but generally the most typical lengths are from 12 to 48 inches. The diameter may also widely vary, but are generally ⅞ to 1 ⅛inch. Inexpensive rebar, or reinforcement bar which is used for reinforcing concrete structures may be used for the anchor member 11. For example, anchor member 11 may consists of No. 7 Rebar which has an outside diameter of ⅞ inch. This is relatively inexpensive steel member desinated as ASTM A-615 Grade 40. In this situation, bore hole 15 would be drilld and tapped to receive a regular ⅝ inch roof bolt, and the open end of bore 15 would be counterbored as in licated in the FIG.

The resin cartridge or capsule 25 is readily available on the market such companies as Celtite, Inc. of Cleveland, Ohio an DuPont of Wilmington, Del. Full resin encapsulation of the anchor member 11 is not necessary, and in addition, excessive resin could possibly then flow past stop nut 13 and interfere with the threading of bolt stem 14 in threaded bore 15. In addition, stop nut 13 is provided with a diameter which is larger than the diameter of anchor member 11 in order to act as a seal or stop to inhibit the flow of resin from the anchor member surface to the threaded portion 14 of bolt 12. It has been found that with the proper amount of resin, no additonal seal is required, as is done with resin anchor bolts of the prior art having O-ring or rubber seals.

FIG. 1 represents the first step carried out in utilization of the anchor bolt assembly of the present invention. After bore hole 29 has been drilled, resin capsule 25 is inserted in the back of the bore hole. The forward end 28 of the bolting assembly 10 is inserted as illustrated in the FIG. At this point, a rotating power tool is attached to bolt head 18 and the entire bolt assembly is thus rotated at a speed of at least 120 r.p.m., while the entire anchor bolt assembly is being simultaneously urged deeper into bore hole 29. This causes the thin-skin capsule 25 to rupture and the rotating action also mixes the quick-setting adhesive resin and catalyst hardener contained within capsule 25 and uniformly distributes the mixture over the exposed surfaces of anchor member 11 and the interior walls of bore hole 29 about the anchor member 11.

The anchor bolt assembly is thus inserted into bore hole 29 until bearing plate 19 is adjacent the outer face 30' of the rocklike structure 30 as indicated in FIG. 2. The resin then sets in a matter of seconds, and the anchor member 11 is secured in bore hole 29 and the assembly then appears as illustrated in FIG. 2.

The entire mixing, inserting and curing operation takes no more than 15 seconds to 1 ½ minutes to reach the stage illustrated in FIG. 2, depending upon the type of resin selected, as some are extremely fast setting while others take a matter of seconds longer to cure and set.

The outer cylindrical surface of anchor member 11 is knurled in order to assist in mixing the resin and also to provide a good gripping surface for the cured resin to adhere to. In this regard, conventional Rebar is already provided with a ribbed surface, and thus makes excellent base stock for the manufacture of the anchor members 11.

Once the intermediate stage of utilization has been reached as illustrated in FIG. 2, a wrench or power tool is again applied to bolt head 18, and it is rotated in the proper direction to further threadably advance thraded stem portion 14 into the threaded bore 15 of anchor member 11. At this point, member 11 is rigidly secured within bore hole 29 by the resin and upon application of a predetermined torque (usually about 50 to 60 ft. lbs.), stop nut 13, which abuts against end 22 of the anchor member, will shear or strip over thread stop 20 and slide down the smooth bolt stem portion 16 thereby releasing the stop means. Stop nut 13 will strip over the thread stop 20 because the thin wall thread engaging portions 21 are made of spring steel and will bend to a sufficient degree to slide over the thread stop 20 upon application of the predetermined torque.

Once the stop means has been released, rotation of bolt head 18 may be continued until bearing plate 19 is drawn up tight against the outer suface 30' of the rock structure about the periphery of the bore hole opening. The roof bolting operation is then completed as illustrated in FIG. 3.

From FIG. 3, it may be noted that counterbore 23 is merely provided for clearance of the smooth or unthreaded stem portion 16 of bolt 12, as it penetrates the counterbore after the stop means or stop nut 13 strips over thread stop 20. Counterbore 23 is not required if a different thread stop 20 is utilized. For example, the thread top may be in the form of a small spot weld which will shear off, or an intentional thread flaw. Stop nut 13 may also be substituted with a close-fitting washer which will either shear off or bend itself sufficiently to clear a thread flaw type thread top upon application of the predetermined torque to bolt 12. In this situation, the counterbore 23 would not be required.

Other novel features of the anchor bolt assembly of the present invention are also illustrated in FIG. 3. First of all, it may be noted that the smooth stem portion 16 of the conventional roof bolt 12 penetrates into counterbore 23. Thus, for a given length of bore hole 29, the resin anchor 11 may be longer than that used in the conventional resin anchor bolt assemblies to provide a stronger anchor and more anchor surface for the given bore hole depth. In addition, only three independent parts are required to make up the entire bolt assembly; namely, the anchor member 11, bolt 12, and the stop nut 13. All three of these parts are readily found on the market and the only labor required for manufacture of the anchor bolt assembly is the boring and tapping of bore hole 15 and the boring of counterbore 23.

FIG. 5 illustrates an alternative embodiment of the present invention whih incorporates a mechanical expansion type anchor in addition to the resin anchor. Like parts are designated with the same reference numerals as those for FIGS. 1, 2 and 3.

The anchor bolt assembly of FIG. 5 is illustrated in the same stage of assembly as that of FIG. 2, or FIG. 1. In this embodiment, counterbore 23 is provided with a plurality of annularly spaced open end slots 35 so that end 22 of anchor member 11 may be readily spread under force to engage the side walls of a bore hole such as 29 in FIG. 1, and thereby act as a mechanical anchor.

The stop means is provided by frusto-conical wedge 13' which is threadably received on threaded stem portion 14 of bolt 12, and seats against thread stop 20. The end of narrower diameter of wedge 13' projects into counterbore 23 such that the frusto-conical surface of wedge 13' engages the inside open edge of counterbore 23.

When the anchor bolt assembly combined in the fasion illustrated is anchored with the resin in bore hole 29 as illustrated in a manner similar to FIG. 2, the predetermined thread advancing torque is applied to bolt head 18 which causes frusto-conical wedge 13' to advance further into counterbore 23 and causes the bottom end 22 of anchor member 11 to radially expand as illustrated by the dashed line 22'. As the stop means is thus released, bolt 12 is screwed into bore 15 until bearing plate 19 is drawn up tight against the outer face 30' of the rocklike structure while at the same time slotted ends 22 of anchor member 11 are spread to engage and penetrate the side walls of bore hole 29 to act as a mechanical anchor for anchor strength in addition to the resin anchor.

In order to prevent the resin from flowing into the area of slotted end 22 where it might interfere with the mechanical expansion anchor, an annular seal or O-ring 36 is provided around anchor member 11 beyond the closed ends of slots 23. This combination provides a combination mechanical-resin anchor which is simple in construction, economical to manufacture and yet provides an effective anchor.

It is pointed out in this FIG. that member 19 is a forged washer molded or formed as an integral part of bolt head 17 as opposed to the configuration in FIGS. 1, 2 and 3 wherein the bearing plate 19 is a separate member.

I claim:

1. A bolt assembly for mounting in position within a bore hole extending inwardly from the face of a rock-like structure such as a mine roof to reinforce the structure comprising, elongated anchor means for insertion into a bore hole to fracture a capsule containing a quick-setting adhesive, a headed bolt having a threaded stem portion threadably received within a threaded bore in one end of said anchor means and stop means carried on the stem of said bolt at a predetermined position below said one end of said anchor means to initialy limit the extent of threadable advancement of said stem portion into the threaded interior of said anchor means by engaging said one end of said anchor means, said stop means releasable upon application of a predetermined thread advancing torque to said bolt relative to said anchor means.

2. The bolt assembly of claim 1 wherein said stop means consists of a nut engaging a thread stop on said bolt stem and having thin wall thread engaging portions which are strippable over said thread stop upon application of said predetermined torque to said bolt.

3. The bolt assembly of claim 2 including a counterbore at said one end of said anchor means of larger diameter than said threaded bore.

4. The bolt assembly of claim 3 wherein said nut is larger in diameter than said anchor means to inhibit the flow of an adhesive from the surface of said anchor member to said bolt.

5. The bolt assembly of claim 4 wherein said thread stop is the transition point from a threaded stem end portion of said bolt to a non-threaded stem portion of said bolt adjacent the bolt head.

6. The bolt assembly of claim 1 wherein said stop means is the combination of a washer means receivable on said threaded stem portion at said predetermined position by a thread top engageable by said washer to initially limit advancement of said threaded stem portion into said anchor means but releasable upon reaching said predetermined torque.

7. The bolt assembly of claim 1 including a counterbore at said one end of said anchor means of larger diameter than said threaded bore, said counterbore end of said anchor means having a plurality of annularly spaced longitudinal open end slots to permit forced radial spreading of said counterbore end, annular seal means carried by and around said anchor member beyond the closed ends of said slots for inhibiting the flow of an adhesive on the other end of said anchor means to said slotted end, said stop means consisting of a frusto-conical stop wedge fixed on said bolt stem with the narrower diameter end of said wedge projecting into said counterbore with the frusto-conical surface of said wedge engaging the inside open end of said counterbore, said wedge being further advanceable into said slotted counterbore to radially spread the same outward as a mechanical anchor upon application of said predetermined torque to said bolt.

8. A roof bolting assembly for mounting in position within a bore hole of a mine roof that is to be strengthened which comprises, an elongated anchor member of a shorter length than the depth of the bore hole and having a threaded bore in one end thereof with a counterbore of larger diameter at said one end, a destructible capsule that contains quick-setting adhesive resin and catalyst hardener resin materials for insertion into the back end of the bore hole, a headed bolt having associated bearing plate means under the head to bear against the front face of a mine roof and a threaded stem portion opposite said head and which is threadably received in said bore and an unthreaded shank portion adjacent said head, a stop nut threaded on said bolt stem adjacent said unthreaded shank portion and abutting against said anchor member end and strippable over said unthreaded shank portion upon application of a predetermined thread advancing torque to said bolt relative to said anchor member, said anchor member and said bolt with said stop nut as assembled in the defined manner being adapted to endwise insert and rotatably advance said anchor member within said bore hole by rotatably advancing said bolt until the other end of said anchor member engages and fractures said capsule and mixes and distributes the resin material content thereof within the bore hole from its back end and forwardly along said member, said mixed resin material being adapted to quickly set within the bore hole and to thereby non-rotatably secure said anchor member therein so said bolt may be turned relative to said anchor member to threadably advance therein upon application of said predetermined torque to strip said stop nut over said unthreaded shank portion and thereafter advance into said anchor member until said bolt is drawn up and tensioned to hold said bearing plate means in tight engagement with the front face of the roof about the bore hole therein.

9. A roof bolting assembly for mounting in position within a bore hole of a mine roof that is to be strengthened which comprises, an elongated anchor member of a shorter length than the depth of the bore hole and having a threaded bore in one end thereof with a counterbore of larger diameter at said one end, said counterbore end of said anchor member having a plurality of annularly spaced longitudinal open end slots to permit forced radial spreading of said counterbore end, annular seal means carried by and around said anchor member beyond the closed ends of said slots for inhibiting the flow of an adhesive on the other end of said anchor means to said slotted end, a destructible capsule that contains quick-setting adhesive resin and catalyst hardener resin materials for insertion into the back end of the bore hole, a headed bolt having associated bearing plate means under the head to bear against the front face of a mine roof and a threaded stem portion opposite said head and which is threadably received in said bore and an unthreaded shank portion adjacent said head, a frusto-conical stop wedge threaded on said bolt stem adjacent said unthreaded shank portion and the narrower diameter end of said wedge projecting into said counterbore with the frusto-conical surface of said wedge engaging the inside open end of said counterbore, said wedge being futher advanceable into said slotted counterbore to radially spread the same outward as a mechanical anchor in the bore hole upon appliation of a predetermined thread advancing torque to said bolt relative to said anchor means, said anchor member and said bolt with said stop wedge as assembled in the defined manner being adapted to endwise insert and rotatably advance said anchor member within said bore hole by rotatably advancing said bolt until the other end of said anchor member engages and fractures said capsule and mixes and distributes the resin material content thereof within the bore hole from its back end and forwardly along said member to said seal means, said mixed resin material being adapted to quickly set within the bore hole and to thereby non-rotatably secure said anchor member therein so said bolt may be turned relative to said anchor member to threadably advance therein upon application of said predetermined torque to advance said stop wedge into said counterbore until said bolt is drawn up and tensioned to hold said bearing plate means in tight engagement with the front face of the roof about the bore hole therein and said split end is expanded to engage the sides of the bore hole.

10. A method reinforcing a mine roof having a rock-like construction which comprises, boring an elongated hole into the roof from an outer face thereof; providing a bolting assembly of an elongated anchor member of a shorter length than the depth of the bore hole and having a headed bolt with a stem threadably received within a threaded bore in one end of said anchor member and having a stop carried on the stem of the bolt at a predetermined position to initially limit the extent of threadable advancement of the bolt stem into the threaded interior of the anchor member by engaging said one end of the anchor member; by engaging said one end of the anchor member; first inserting a quick-setting resin adhesive material contained within a thin-skinned capsule into the inner end of the bore hole, inserting the bolting assembly into the bore hole with the anterior end of the anchor member in engagement with the capsule, rotating the bolting assembly and employing the anterior end of the anchor member to rupture the skin of the capsule and mix its resin material content, flowing the mixed resin material about and between the outer periphery of the anchor member and the inner periphery of the bore hole and restricting its flow to substantially the length of the anchor member during the rotative advance of the bolting assembly, terminating the rotation and hardening the mixed resin material about the anchor member to non-rotatably secure it within the bore hole, applying a predetermined thread advancing torque to the bolt and thereby releasing the stop carried on the bolt stem, and then threadably advancing the bolt within the anchor member and drawing the head up against the outer face of the roof about the bore hole by tightening the bolt under tension with the anchor member.

11. The method of claim 10 wherein the stop is a nut abutting against the bored end of the anchor member and having thin wall thread engaging portions abutting against a non-threaded stem portion of the bolt which is adjacent the head thereof and the threaded bore of the anchor member is provided with a counterbore of larger diameter at the bore end of the anchor member to receive the unthreaded stem portion of the bolt with clearance, the step of applying a predetermined torque being carried out by applying the predetermined torque beng carried out by applying the predetermined torque to the bolt head and thereby stripping the nut over onto the unthreaded stem portion of the bolt.

12. The method of claim 10 wherein the threaded bore of the anchor member is counterbored to a larger diameter and provided with a plurality of annularly spaced longitudinal open end slots at the one end of the anchor member to permit forced radial expansion of the end and the stop is a frusto-conical wedge fixed on the bolt stem with the narrower diameter end of the wedge projecting into the counterbore with the frusto-conical surface engaging the inside open end of the counterbore, the step of applying a predetermined torque being carried out by applying the predetermined torque to the bolt head and thereby advancing the wedge into the slotted counterbore by radially spreading it, and including the step of further advancing the wedge into the slotted counterbore by threadably advancing the bolt until the slotted end of the anchor member engage the interior periphery of the bore hole as an additional mechanical anchor.

* * * * *

UNITED STATES PATENT OFFICE
CERTIFICATE OF CORRECTION

PATENT NO. : 4,023,373
DATED : May 17, 1977
INVENTOR(S) : Edward C. Hipkins

It is certified that error appears in the above-identified patent and that said Letters Patent are hereby corrected as shown below:

Col. 7, line 12, erase "initialy" and substitute --initially--

Col. 8, line 56, erase "appliation" and substitute --application--

Col. 9, line 9, after "method" insert --of--

Col. 9, lines 20 and 21, delete "by engaging said one end of the anchor member;"

Col. 10, line 16, delete "beng carried out by applying the predetermined torque"

Col. 10, line 34, erase "end" and substitute --ends--

Signed and Sealed this

Fifteenth Day of November 1977

[SEAL]

Attest:

RUTH C. MASON
Attesting Officer

LUTRELLE F. PARKER
Acting Commissioner of Patents and Trademark